UNITED STATES PATENT OFFICE.

ARNOLD H. PETER, OF NEW YORK, N. Y., ASSIGNOR TO ROYAL BAKING POWDER COMPANY, OF NEW YORK, N. Y., A CORPORATION OF NEW JERSEY.

BAKING-POWDER.

1,265,369.  
Specification of Letters Patent.  
Patented May 7, 1918.

No Drawing. Application filed September 16, 1916. Serial No. 120,435.

*To all whom it may concern:*

Be it known that I, ARNOLD H. PETER, a citizen of Switzerland, residing in the city of New York, in the State of New York, have invented a new and useful Improvement in Baking-Powders, of which the following is a specification.

The invention relates to an improved baking powder. Baking powders consist essentially of sodium-bicarbonate and another constituent which, in the presence of water or water-containing substances, acts upon the alkali and liberates carbonic acid gas, which exerts a leavening action. Many suggestions have been made and various substances used as the acid constituent, all of which have been more or less objectionable as injurious to health or occasioning ill-timed reactivity with the bicarbonate or involving excessive cost. Among the objects of the invention is the production of a baking powder free from all these objections and in many respects superior to baking powders heretofore known. The healthfulness of a baking powder depends largely upon the nature of the residue resulting from the reaction of the constituents and the effect thereof on the organism. Lactic acid is desirable in this respect, but it is not available in that form by reason of improper timing of the reaction.

I have found that to the healthfulness of lactic acid may be added proper timing of the reaction by using as the acid constituent a mixture of an acid calcium-lactate and an anhydrous form of lactid preferably the specific forms of such substances hereinafter described, the acid calcium-lactate serving to hasten the reaction between the acid ingredients and the alkali and thus accomplish the proper timing of the reaction. The proportion of the acid calcium-lactate to the lactid depends upon the desired quickness of the reaction, which in turn depends upon considerations of climate, packages and the like.

The acid calcium-lactate may be any one of several, but the substance I prefer to use is one wherein the calcium (Ca) is combined with four molecules of lactic acid $(C_3H_6O_3)$, according to the following formula:—

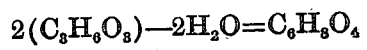

So, too, the lactid may be any anhydrous lactid, but the preferred substance is one of a high degree of purity, wherein two molecules of water are lost between two molecules of acid, as represented by the following formula:—

$$2(C_3H_6O_3) - 2H_2O = C_6H_8O_4$$

In making the baking powder, I prefer to make the mixture in substantially equimolecular proportions, when a considerable amount of acid calcium-lactate is used. When, however, the acid ingredient of the powder comprises much lactid in proportion to acid calcium-lactate, then I prefer to use some excess of acid ingredient to the alkali in order to insure complete reaction of the alkali and thus prevent impairment of the flavor of the food.

It will be understood that sundry substitutions may be made in the constituents of the powder—other suitable alkalis substituted for the bicarbonate or other suitable acid salts of lactic acid for the calcium-lactate—without departing from the spirit of the invention or the scope of some of the claims hereinafter made.

I claim:—

1. A baking powder comprising as its acid constituent a mixture of lactid and an acid salt of lactic acid.

2. A baking powder comprising as its acid constituent a mixture of a double anhydrid of lactic acid and an acid salt of lactic acid.

3. A baking powder comprising as its acid constituent a mixture of the ester-acid-anhydrid of lactic acid and an acid salt of lactic acid.

4. A baking powder comprising as its acid constituent a mixture of lactid and an acid salt consisting of the combination of calcium with four molecules of lactic acid.

5. A baking powder comprising the acid salt consisting of the combination of calcium with four molecules of lactic acid.

6. As a new article of manufacture, an effervescent mixture containing a bicarbonate of alkaline metal and an acid constituent consisting of any of the substances defined in claims 1, 2, 3, 4, and 5.